Sept. 8, 1942.   J. T. KING   2,295,177
PREHEATER FOR AIRCRAFT
Filed July 29, 1940   2 Sheets-Sheet 2
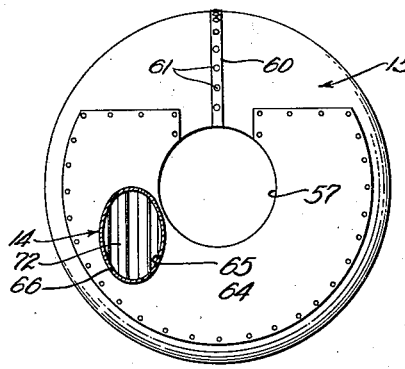
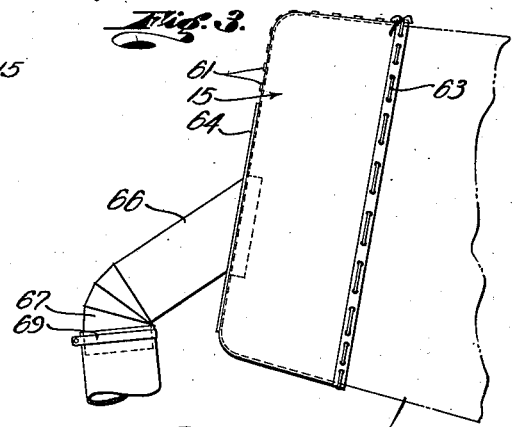
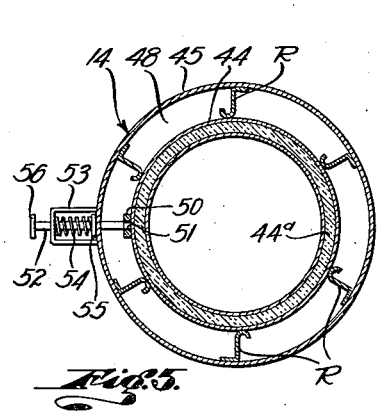
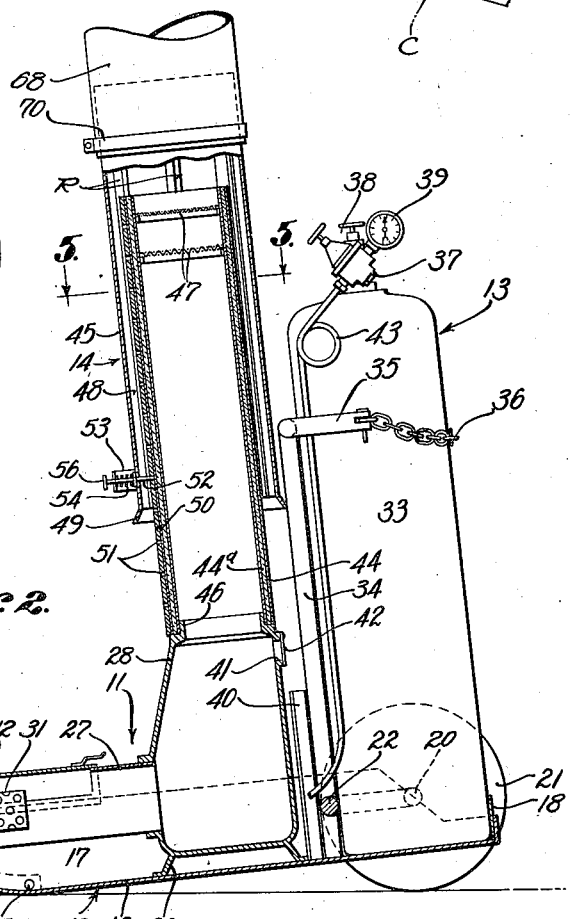
Inventor
JAMES T. KING
By
His Attorney Patented Sept. 8, 1942

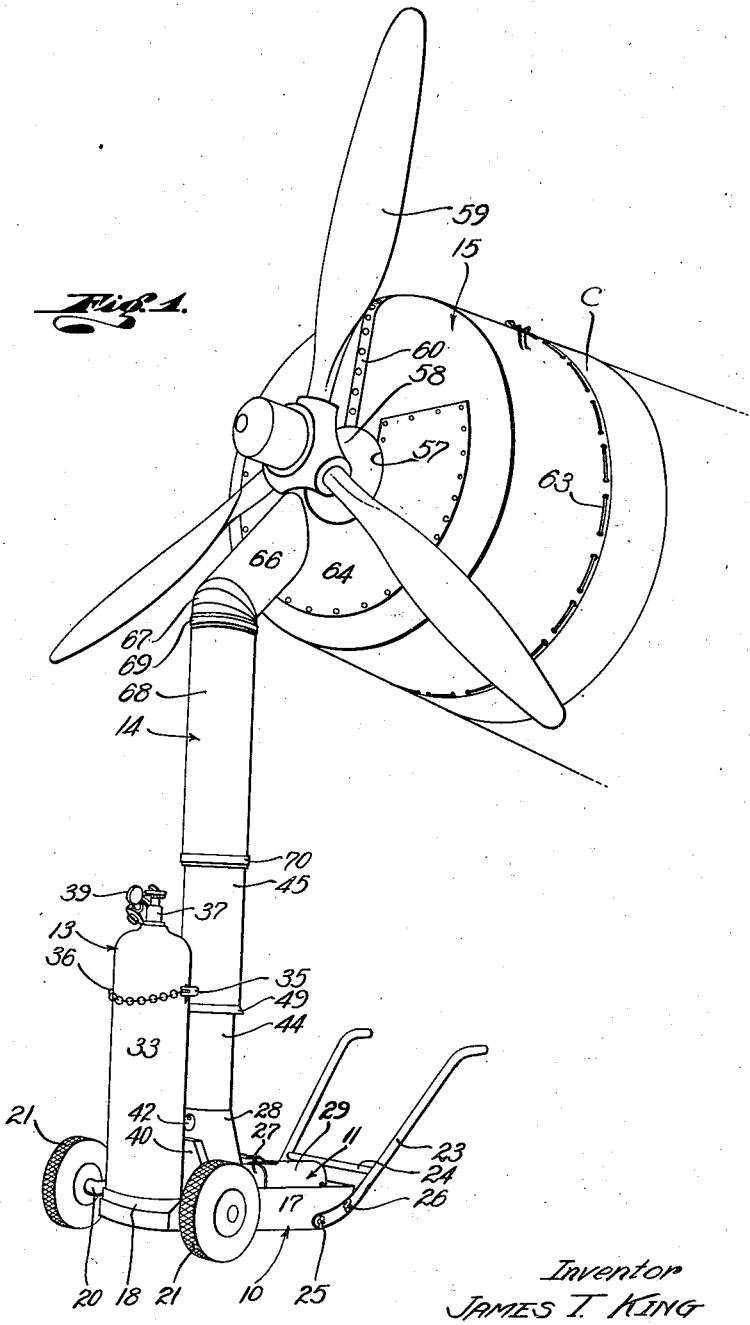

2,295,177

UNITED STATES PATENT OFFICE 2,295,177

PREHEATER FOR AIRCRAFT

James T. King, Los Angeles, Calif., assignor to Leo M. Harvey, Los Angeles, Calif.

Application July 29, 1940, Serial No. 348,183

2 Claims. (Cl. 263—19)

This invention relates to heating devices and relates more particularly to heaters for preheating aircraft engines, nacelles, cabin compartments, etc. A general object of this invention is to provide a practical safe and efficient aircraft preheater of the character mentioned.

The internal combustion engines of aircraft are not suitable for use until they have been heated to efficient operating temperatures. It is customary to warm up an aircraft engine by allowing it to run idle for a considerable period and in some cases the engine is heated or partially heated with the flame of a blow torch. Warming up an aircraft engine by allowing it to run idle for a substantial time with the plane grounded is time consuming and expensive, requiring a considerable amount of engine fuel. Further, the operation of the aircraft engine when cold subjects the engine to excessive wear, the cold lubricants being ineffective during the warming up operation.

Another object of this invention is to provide a portable heater operable to quickly and effectively warm or preheat the engine of an aircraft for immediate efficient operation.

Another object of this invention is to provide a heater of the character mentioned having a shroud adapted to be arranged about the engine cowl and an efficient heater means delivering heated air to the shroud to warm the entire engine and adjacent parts.

Another object of this invention is to provide an aircraft heater of the character mentioned embodying an adjustable, insulated stack leading to the shroud, adapting the device for the immediate preheating of engines of different sizes, types, etc.

Another object of this invention is to provide an aircraft preheater of the character referred to in which the stack may be manipulated or arranged to discharge into the nacelles, cabin compartment, or other part of the aircraft to warm the lubricant tanks, lubricant lines, etc. and to make the cabin ready for occupancy and, if desired, may be conditioned and employed to defrost the propellers, wing surfaces, tail surfaces, etc.

Another object of this invention is to provide a portable aircraft heater that is convenient and safe to employ, embodying a fully insulated fire box, stack, etc., and embodying spark arrestors in the stack.

Another object of this invention is to provide a portable aircraft heater that is self-contained and compact, including a fuel supply, a burner, burner controls, heater, stack, etc., and provided with wheels and skids to be quickly moved from place to place.

A further object of this invention is to provide an aircraft preheater that is inexpensive to manufacture and that is efficient and inexpensive in operation.

The various objects and features of my invention will be fully understood from the following detailed description of a typical preferred form and application of my invention, throughout which description reference is made to the accompanying drawings, in which:

Fig. 1 is a perspective view of the heater of the present invention with its shroud in active position around the cowl of an aircraft engine. Fig. 2 is an enlarged vertical detailed sectional view of the principal portion of the heater showing a part of the stack and the fuel supply tank in elevation. Fig. 3 is a fragmentary side elevation of the shroud. Fig. 4 is a rear elevation of the shroud and Fig. 5 is an enlarged fragmentary transverse detailed sectional view taken as indicated by line 5—5 on Fig. 2.

The improved portable aircraft heater of the invention may be said to comprise, generally, a wheeled carrier or body 10, a fire box 11 on the body 10, a burner 12 at the fire box 11, fuel supply means 13 carried by the body 10 for delivering fuel to the burner 12, an adjustable heat delivering stack 14 for the fire box 11 and a shroud 14 for communicating with the upper end of the stack 14 and adapted to fit about a cowl C of an engine.

The body 10 serves to support the various other parts of the device and in accordance with the invention is in the form of a vehicle or wheeled carrier so that the device may be readily moved about by the operator. The body 10 may be varied considerably without departing from the invention. In the case illustrated the body 10 has a bottom 16, spaced sides 17, a forward end 18, and a rear end 19. The sides 17 and the front 18 are substantially upright. The rear portion of the bottom 16 curves upwardly and rearwardly so that it may have a sled or skid action. The forward ends of the sides 17 are cut back or sloped rearwardly and upwardly and an axle 20 projects laterally from these cut away parts of the body sides 17. Suitable wheels 21 are rotatable on the projecting parts of the axle 20 and may be provided with pneumatic tires. The intermediate portion 22 of the axle 20 is stepped rearwardly to be some distance from the forward end of the body 10. Handles 23 are provided to facilitate the manipulation and manual propulsion of the heater. The handles 23 project upwardly and rearwardly from the rear portion of the body 10 and are joined between their ends by a brace 24. It is preferred to connect the handles 23 with the body sides 17 in such a manner that the handles may be folded or swung to retracted or inactive positions. Hinge pins 25 pivotally connect the lower ends of the handles 23 with the body sides 17 and pins 26 provided with removable wing nuts connect the handles with the body sides 17 at points spaced from the hinge pins 25 to normally hold the handles in their active positions. Suitable grips may be provided on the outer ends of the handles 23.

The combustion chamber or fire box 11 is arranged on the body 10 below the stack 14. The fire box 11 includes a generally horizontal rear portion 27 and an upright portion 28 joining the horizontal portion 27. The rear portion 27 of the fire box 11 is arranged longitudinally between the body sides 17 and has an access opening in its upper end normally closed by a hinged or removable cover 29. The upright portion 28 of the fire box 11 is supported by legs 30 suitably secured to the bottom 16 of the body 10. The upper part of the upright fire box portion 28 may be reduced or tapered. The substantially horizontal fire box portion 27 discharges into the lower end of the upright box portion 28 and the heat rises through the portion 28 to pass upwardly into the stack 14. The fire box 11 may be suitably insulated.

The burner 12 is preferably arranged to direct its flame forwardly in the rear portion 27 of the fire box 11. Any suitable form or type of fluid fuel burner may be employed. In the typical form of the invention illustrated the burner 12 is a blow torch type of burner including a perforated flame tube 31. The torch tube 31 is supported in the rear portion of the fire box 11 to direct its flame forwardly through the fire box portion 27. The burner 12 may be suitably attached to the rear end 19 of the body 10. The burner 12 preferably includes a control valve 32 accessible at the rear of the body 10. The burner 12 is accessible through the access opening of the box portion 27 to be readily lit, examined, cleaned, etc.

It is a feature of the invention that the fuel supply means 13 is carried by the mobile body 10 to make the heater self-contained and fully portable. The fuel supply means 13 includes a container or tank 33 for holding a suitable fuel. The fuel employed may be propane or butane held under a suitable pressure. The fuel tank 33 is arranged in front of the fire box 11 and its lower end may rest on the bottom 16 of the body 10. The bent axle portion 22 forms a yoke for engaging about the rear of the tank 33 and the body front 18 may be shaped to fit about the tank. An upwardly projecting standard 34 is provided at the rear of the tank 33 and carries a yoke or fork 35 for engaging about the rear of the tank 33 adjacent the upper end of the tank. A chain 36 is releasably secured to the arms of the fork 35 and engages about the tank 33 to hold the tank in place. A fitting 37 is secured to the upper end of the tank 33 and has an appropriate valve 38 and a pressure gauge 39. A fluid line or pipe 43 leads from the valved fitting 37 to the valve 32 of the burner 12. An insulated partition 40 may be secured in the body 10 at the front of the fire box 11 to protect the tank 33 against excessive heat. Means is provided for heating the fuel tank 33 in very cold weather. An opening 41 is formed in the forward wall of the fire box 11 to oppose the rear side of the tank 33. A hinged or swinging cover 42 normally closes the opening 41. When the opening 41 is uncovered heat from the fire box 11 rises about the tank 33 to warm the same. The fuel tank 33 arranged as described above may be removed for replacement when empty. The pipe 43 is readily disconnected from the fitting 37 and the chain 36 is easily released to free the tank 33 for removal.

The heating flue or stack 14 carries the heat upwardly for delivery to the shroud 15 or for direct delivery to compartments of the aircraft. In accordance with the invention the stack 14 is adjustable, comprising a stationary section 44 and an adjustable or shiftable section 45. The relatively stationary stack section 44 is secured to a reduced neck 46 on the upper end of the fire box 11 and extends upwardly a substantial distance. It is preferred to insulate the lower stack section 44. In practice the stack section 44 may be constructed of two spaced concentric tubes with a suitable insulating material 44ᵃ packed between the tubes. Vertically spaced spark arrestors 47 are secured in the stack section 44. The spark arrestors 47 are preferably in the nature of wire mesh screens and prevent the passage of sparks into the upper stack section 45 and the shroud 15.

The shiftable stack section 45 extends downwardly over the relatively stationary section 44. The stack section 45 is a rigid metal tube and surrounds the section 44 with substantial clearance leaving an annular air passage 48. The passage 48 serves to admit air to the column of heated air passing through the stack 14. The lower end of the stack section 45 is flared as at 49 to better admit the air to the opening 48. The heat or heated air passing upwardly through the stack 14 draws or induces outside air through the opening 48. Spaced vertically extending ribs R are secured to the interior of the stack section 45 and engage or ride on the stack section 44 to maintain the spaced relation of the stack sections 44 and 45. Means is provided for releasably holding or supporting the shiftable stack section 45 at any selected or required elevation. This means comprises a strip or plate 50 arranged longitudinally of and secured to the stack section 44. The plate 50 is provided with a row of spaced openings 51. A shiftable pin or latch 52 is carried by the stack section 45 to cooperate with the openings 51. The latch 52 passes through openings in the section 45 and a housing 53 secured to the exterior of the stack section. A compression spring 54 is arranged in the housing 53 to bear inwardly against a collar 55 fixed to the latch 52. The outer end of the latch 52 has a suitable handle 56. The latch 52 may be released by pulling outwardly on the handle 56 and may be engaged in any selected opening 51 to retain or support the stack section 45 in the selected position.

The shroud 15 is adapted to be arranged about the cowl of the engine to be heated and, of course, may be varied in size, shape and construction to adapt it for application to different types of engines. In the case illustrated the shroud 15 is shaped to fit about a substantially cylindrical engine cowl C having a rounded forward end. The shroud 15 is preferably formed of fabric which may be treated to be heat and fire resisting or is formed of asbestos fabric and is shaped to readily fit about the cowl C. A central opening 57 is provided in the forward end of the shroud 15 to receive the shaft or bearing 58 of the propeller 59. A slit 60 extends from the opening 57 to the rear end of the shroud 15. Releasable fasteners 61, such as snap fasteners, are arranged along the margins of the slit 60 and are adapted to close the slit to hold the shroud 15 about the cowl C. A draw cord 63 may be laced through a doubled rear edge portion of the shroud 15 to assist in retaining the shroud on the cowl C. The draw cord 63 may have protruding end portions adapted to be tensioned to draw the cord tightly on the cowl C and adapted to be tied.

An adjustable and readily disconnectable means is provided for associating the shroud 15 with the stack 14. This means includes a segmental or partially circular plate 64 of substantially rigid material secured to the front of the shroud 15. The plate 64 is below the opening 57 and covers a substantial part of the shroud's front. An opening 65 is provided in the plate 64 and is located at one side of the opening 57. A tube or pipe 66 is secured in the opening 65 and extends downwardly and outwardly from the plate 64. An adjustable elbow 67 is secured to the lower end of the pipe 66. A flexible pipe or tube 68 is secured to the elbow 67 by a securing band 69 and hangs from the elbow. The tube 68 is formed of asbestos fabric or the like to be fire and heat resistant. The flexible tube 68 is of substantial length and is proportioned to be passed down over the section 45 of the stack 14. A flexible band 70 is provided on the lower end of the flexible tube 68 and may be tightened to draw the tube 68 onto the stack section 45. With the tube 68 engaged over the stack section 45 the interior of the shroud 15 is in communication with the heater stack 14 to receive the heat therefrom. A deflector 72 may be secured in the opening 65 or the upper portion of the pipe 66. The deflector 72 may comprise a series of spaced vanes arranged to direct the heated air so that it takes a circular path in the shroud.

In the use or operation of the heater the shroud 15 is initially or normally disconnected from the stack 14. The heater may be readily moved or wheeled about and brought to a position adjacent the aircraft. If desired, the stack section 45 may be adjusted vertically and brought to a position to have its upper end discharge directly into a compartment of the aircraft such as the passenger compartment, the nacelles, or the like. In this connection it will be observed that the stack section 45 may be readily adjusted vertically and releasably secured in the adjusted position by means of the latch 52. The heater 12 may be ignited and controlled by the valves 38 and 32 to provide the necessary heat. The burner 12 directs its flame substantially horizontally in the fire box portion 28 and the heat of the flame rises through the fire box portion 28 and the stack 14. The rising heat induces or draws air through the passage 48 and this air is warmed or heated as it continues through the stack. In practice the heater warms the compartment of the aircraft in a most effective manner. Practically all the heat generated by the burner 12 is delivered to the airplane compartment and there is little or no heat loss and the heating operation requires a minimum of time.

When it is desired to warm or preheat an aircraft engine the heater is brought to a convenient position adjacent the engine. The shroud 15 is wrapped about or arranged over the aircraft engine cowl C and secured in place by means of the fasteners 61 and the draw cord 63. The flexible tube 68 is then passed over the upper portion of the stack section 65. The elbow 67 may be adjusted to bring the tube 68 into alignment with the stack 14 and the stack section 45 may be adjusted vertically to extend a suitable distance into the flexible tube 60. The heat from the burner 12 passes up the stack 14 and the tube 68 to be delivered to the shroud 15. Air is induced through the passage 48 and is warmed as it flows upwardly in the stack 14 and tube 68. The shroud 15 may completely enclose the engine containing portion of the cowl C so that practically all of the heat is delivered to the engine. The heater of the invention is operable to evenly and thoroughly heat the engine in a minimum of time. The engine may be brought to a temperature at which it will operate most efficiently. The shroud 15 may be quickly removed from about the cowl C and the portable heater may be moved away from the aircraft.

Having described only a typical preferred form and application of the invention, I do not wish to be limited or restricted to the specific details herein set forth, but wish to reserve to myself any variations or modifications that may appear to those skilled in the art or fall within the scope of the following claims.

Having described my invention, I claim:

1. A device for heating aircraft engines, compartments, etc. including a body, a fire box on the body having an upwardly extending heat passing stack, burner means at the fire box, a fuel container supported by the body to be in adjacent relation to the fire box, means for conducting fuel from the container to the burner means, the fire box having an opening for passing heat to the container to preheat the fuel therein, and means controlling said opening.

2. A device for heating aircraft engines, compartments, etc. including a fire box, an upwardly extending heat conducting stack leading from the fire box, the stack including a relatively stationary stack section on the fire box, a shiftable stack section telescoping over the upper portion of the first named stack section with clearance, leaving a passage through which air is induced into the stack, and means guiding the second mentioned stack section for vertical adjustment, and burner means at the fire box.

JAMES T. KING.